United States Patent [19]

Soupirot et al.

[11] Patent Number: 5,375,122
[45] Date of Patent: Dec. 20, 1994

[54] TELEPHONY DEVICE FOR A TELEPHONY COMMUNICATIONS NETWORK WITH FIXED STATIONS AND INDEPENDENT STATIONS

[75] Inventors: Joël Soupirot, La Voulte; Bernard Lehembre, Bois d'Arcy, both of France

[73] Assignee: Dassault Automatismes et Telecommunications, Plaisir, France

[21] Appl. No.: 965,087

[22] Filed: Oct. 22, 1992

[30] Foreign Application Priority Data

Oct. 22, 1991 [FR] France ................... 91 13033

[51] Int. Cl.⁵ ............... H04B 7/26; H04J 3/16; H04L 12/66
[52] U.S. Cl. ................... 370/95.1; 379/58; 455/54.1
[58] Field of Search ............... 370/95.1, 95.3; 379/58, 379/59, 60, 63; 455/33.1, 53.1, 54.1, 54.2, 561

[56] References Cited

U.S. PATENT DOCUMENTS

| | | | |
|---|---|---|---|
| 4,785,450 | 11/1988 | Bolgiano et al. | 370/95.1 |
| 4,827,499 | 5/1989 | Warty et al. | 379/63 |
| 4,829,554 | 5/1989 | Barnes et al. | 379/63 |
| 5,036,531 | 7/1991 | Spear | 379/63 |
| 5,040,177 | 8/1991 | Martin et al. | 370/110.1 |
| 5,157,709 | 10/1992 | Ohteru | 379/63 |
| 5,177,780 | 1/1993 | Kasper et al. | 379/63 |

FOREIGN PATENT DOCUMENTS

| | | |
|---|---|---|
| 0456546 | 11/1991 | European Pat. Off. |
| 2675325 | 10/1992 | France |
| WO91/10333 | 7/1991 | WIPO |

*Primary Examiner*—Wellington Chin
*Attorney, Agent, or Firm*—Foley & Lardner

[57] ABSTRACT

A fixed station (BFR1) is able to interact with a plurality of independent stations (SA1, ..., SA4) and is linked to an external management unit (UGRB1) only by the intermediary of a single pair of telephony wires (LT). This management unit (UGRB1) then incorporates the management and monitoring means for the telephony communications, and is linked to the switched telephone network (CTPU) as well as to digital channels (CNPU). Communication between the independent stations (SA1, ..., SA4) and the fixed terminal (DFR1) is carried out by the intermediary of a plurality of elementary voice channels and of elementary signaling channels while the transmission line (LT) is capable of transporting a voice line channel and a signaling line channel according to a predetermined bidirectional time framing. The terminal and its management unit are then suitable for carrying out multiplexing/demultiplexing between these various channels.

14 Claims, 8 Drawing Sheets

TELEPHONY DEVICE FOR A TELEPHONY COMMUNICATIONS NETWORK WITH FIXED STATIONS AND INDEPENDENT STATIONS

BACKGROUND OF THE INVENTION

The invention relates to telephony.

It is more particularly intended to serve in a telephony communications network between fixed stations, such as telephony stations, connected to the telephony channels of the network and independent stations, such as portable telephone handsets, likely to be in telephony communication with these fixed stations.

Such a network is, for example, that known under the trademark POINTEL, and the invention finds a particularly advantageous, but not limiting, application therein.

In such a network, fixed terminals are provided which are capable of mutual, remote interaction with the independent stations. These terminals can be connected to the switched telephone network, either directly or by the intermediary of centralized connecting units. The terminals may manage several telephony links with several independent stations and it is then especially necessary to provide several telephone lines between a terminal and its connecting unit.

Moreover, the major part of the means allocated to management of the telephone communications is incorporated into the terminal.

All this leads to complex and expensive equipment offering limiting upgrade for new services.

Current technology does not make it possible to significantly reduce the size and the cost of this equipment.

SUMMARY OF THE INVENTION

The main object of the invention is to provide a solution to this problem.

Another object of the invention is to guarantee a wide upgrade path for the system.

According to a general characteristic of the invention, the telephony device includes:

at Least one fixed terminal. The fixed terminal has a radiofrequency transmission/reception interface able to operate according to a plurality of radiofrequency channels. Each channel is capable of transporting at least one elementary voice channel and an elementary signaling channel according to a predetermined elementary time framing, in order to permit voice and signaling information exchange with independent stations. The fixed terminal also has a first line interface with a transmission line capable of transporting at least one voice line channel and a signaling line channel according to a predetermined, bidirectional line time framing. In addition, the fixed terminal has a terminal processing means.

The terminal processing means includes first multiplexing/demultiplexing means suitable for bidirectionally performing multiplexing/demultiplexing between, on the one hand, the plurality of elementary voice channels and the plurality of elementary signaling channels and, on the other hand, a multiplexed voice channel and a multiplexed signaling channel. The terminal processing means also includes first frame coding/decoding means, connected between the first multiplexing/demultiplexing means and the first line interface. The first frame coding/decoding means is suitable for carrying out a bidirectional frame conversion and ensuring correspondence, on the one hand between the signaling information contained in the multiplexed signaling channel and in the signaling line channel, and on the other hand between the voice information contained in the multiplexed voice channel and in the voice line channel, in order to permit the exchange of voice and signaling information between the transmission line and the various radiofrequency paths allocated to the various independent stations in telephony communication with fixed stations.

The first frame coding/decoding means also includes fixed management means, situated outside the fixed terminals. The fixed management means includes a second line interface with the transmission line and direct connection means to the telephony channels of the network for the flow of voice information between the fixed stations and the fixed management means. The fixed management means further includes second frame coding/decoding means, connected to the second line interface. This second frame coding/decoding means is suitable for carrying out a bidirectional frame conversion in order to restore and reciprocally receive the multiplexed voice and signaling channels.

The fixed management means further includes second multiplexing/demultiplexing means, connected between the second frame coding/decoding means and the direct connection means. The second frame multiplexing/demultiplexing means is and suitable for performing bidirectional multiplexing/demultiplexing between the multiplexed voice channel and the plurality of elementary voice channels in order to permit the exchange of voice information between the direct connection means and the second frame coding/decoding means.

Also included in the fixed management means is second processing means suitable for carrying on a dialog with the terminal via the multiplexed signaling channel, and the signaling line channel in order to manage the allocation of the radiofrequency paths and to monitor the telephony communications.

BRIEF DESCRIPTION OF THE DRAWINGS

Other advantages and characteristics of the invention will emerge on examining the detailed description below and the attached drawings, in which.

DESCRIPTION OF THE EMBODIMENTS

The drawings comprise, in essence, elements of a defined character. That being so, they form an integral part of the description and may serve not only to make the detailed description below better understood, but also to contribute, as the case may be, to the definition of the invention.

Figure 1:
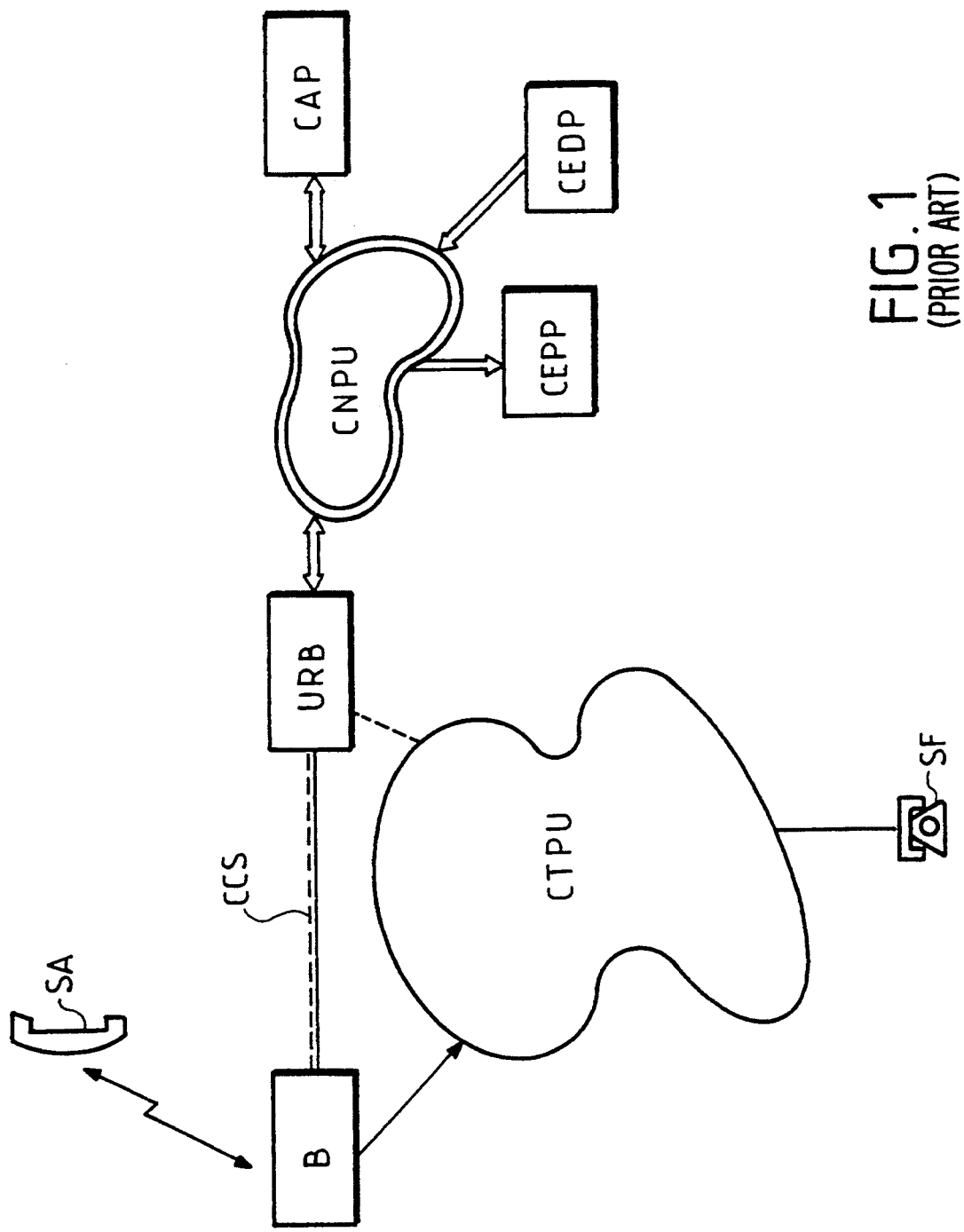
FIG. 1 is a schematic diagram of a Pointel communications network of the prior art.

It is assumed now that the invention applies to the Pointel network, the current structure of which will be very briefly described by referring to FIG. 1.

Independent stations SA, such as portable telephone handsets, are capable of mutual remote interaction with fixed radio terminals B, by the intermediary of a radiofrequency communications medium governed by a standard of British origin called "CAI" ("Common Air Interface").

These fixed terminals B connected to terminal connection units URB via a specialized control channel CCS. Each terminal connecting unit is suitable for managing a group of fixed terminals B.

A fixed terminal may be directly connected to the telephony channels CTPU of the public switched telephone network. In this case, the unit URB which manages it is not connected to these telephony channels.

A fixed terminal may not be directly connected to the telephony channels CTPU. In this case, its connection is effected by the intermediary of a switching unit of its connection unit which is then directly connected to the channels CTPU.

Each terminal B may send out telephone calls only to the telephony channels CTPU but may certainly send out or receive radio calls destined for or originating from independent stations SA.

The communications network comprises, in addition to the telephony channels CTPU, a digital communications medium CNPU, operating on the packet principle, such as the TRANSPAC (trademark) network. The expression "communications medium" is, according to a widespread practice, replaced by the term "channel", although the person skilled in the art then knows that the meaning of the term channel may not be the same as in the case of telephony channels.

On these digital signaling channels CNPU are connected the various units URB and other components of the POINTEL network designated under the references CAP, CEPP and CEDP.

The POINTEL authorization center CAP manages for the whole of the POINTEL network, the subscriptions and thus the POINTEL user authorizations to call a fixed station SF connected to the telephony channels CTPU, from an independent station, and vice versa.

To this end, the terminal connection units URB are connected to the center CAP via the digital channels CNP.

The connecting units URB are also linked to the main POINTEL operations center, CEPP, via the digital channels CNPU, with the aim of transferring information relating to the telephone communications exchanged so that the center CEPP can transmit this information to a billing system.

The decentralized POINTEL operations centers CEDP are management units intended to regionally supervise the operation of the network and especially to detect operating anomalies in the connecting units URB and/or the fixed terminals B.

It should be noted that the centers CEDP an communicate information to the center CEPP by the intermediary of the digital channels for the purposes of national supervision.

The management of the telephone communications and the distribution of the radiofrequency resources are carried out by the fixed radio terminals. The connecting unit URB, whose main role is to provide rapid access to the centralized databases, for example at the centers CAP, CEPP and CEDP, in no case carries out management of the radio communications.

Moreover, the terminals can, needless to say, manage several telephony links with several independent stations but it is then necessary to provide several telephone lines between a terminal and the switching unit of its connecting unit so as to be able to connect these different users to the switched telephone network CTPU.

Furthermore, as the major part of the means allocated to the management of telephone communications is incorporated into the terminal, this type of architecture leads to complex and expensive equipment items.

Moreover, in areas where the number of users is high (city centers, stations, airports, business centers), a better quality of service could be obtained by centralizing the management of a set of terminals.

Current technology does not make it possible to resolve this problem.

The invention aims to provide a solution thereto.

In the field of telephony, digital transmission over a telephone line formed by a pair of wires has been the subject of much lengthy research for several years.

Hence, it was first of all envisaged to transmit the information alternately in one direction then in the other, which would lead to a rate of 384 kilobits per second. Such a rate would, however, suffer from the drawback of offering a limited range.

The next stage of development was to envisage simultaneous transmission of the data in both directions. The rates then progressively evolved from 120 kilobits per second to 80 kilobits per second.

Such transmission modes necessitated the development of echo cancellation circuits making it possible to restore, on the basis of the mixture of information present on the line, the information transported in one direction and that transported in the other direction.

A digital transition mode has been defined for an Integrated Services Digital Network (ISDN). This mode, conforming to recommendation Q921 of the CCITT, permits simultaneous transmission of two channels at 64 kilobits/second and of one channel at 16 kilobits/second.

The Applicant has observed, surprisingly, that it was possible to use such a digital transmission to resolve the problem posed.

Hence, according to a general characteristic of the invention, the telephony device comprises:
1) at least one fixed terminal comprising
   a radiofrequency transmission/reception interface able to operate according to a plurality of radiofrequency channels each capable of transporting at least one elementary voice channel and an elementary signaling channel according to a predetermined elementary time framing, in order to permit voice and signaling information exchange with independent stations,
   a first line interface with a transmission line capable of transporting at least one voice line channel and a signaling line channel according to a predetermined, bidirectional line time framing, and
   terminal processing means comprising
      first multiplexing/demultiplexing means suitable for bidirectionally performing multiplexing/demultiplexing between, on the one hand, the plurality of elementary voice channels and of elementary signaling channels and, on the other hand, a multiplexed voice channel and a multiplexed signaling channel, first frame coding/decoding means, connected between the first multiplexing/demultiplexing means and the first line interface, and suitable for carrying out a bidirectional frame conversion and ensuring correspondence, on the one hand between the signaling information contained in the multiplexed signaling channel and in the signaling line channel, and on the other hand between the voice information contained in the multiplexed voice channel and in the voice line channel, in order to permit the exchange of voice and signaling information between the transmission line and the various radiofrequency paths allocated to the various independent stations in telephony communication with fixed stations, and 2) fixed management means, situated outside the fixed terminals, comprising a second line interface with the transmission line, direct connection means to the telephony channels of the network for the flow of voice information between the fixed stations and the fixed management means, second frame coding/decoding means, connected to the second line interface, and suitable for carrying out a bidirectional frame conversion in order to restore and reciprocally receive the multiplexed voice and signaling channels, second multiplexing/demultiplexing means, connected between the second frame coding/decoding means and the direct connection means, and suitable for performing bidirectional multiplexing/demultiplexing between the multiplexed voice channel and the plurality of elementary voice channels in order to permit the exchange of voice information between the direct connection means and the second frame coding/decoding means, and second processing means suitable for carrying on a dialog with the terminal via the multiplexed signaling channel and the signaling line channel in order to manage the allocation of the radiofrequency paths and to monitor the telephony communications.

In other words, by virtue of the combination of means set out above, the fixed terminal able to interact with the plurality of independent stations is linked to the fixed management means only by the intermediary of a single pair of telephone wires, and the management and monitoring means for the telephone communications are then transferred into the fixed management means.

Figure 2:
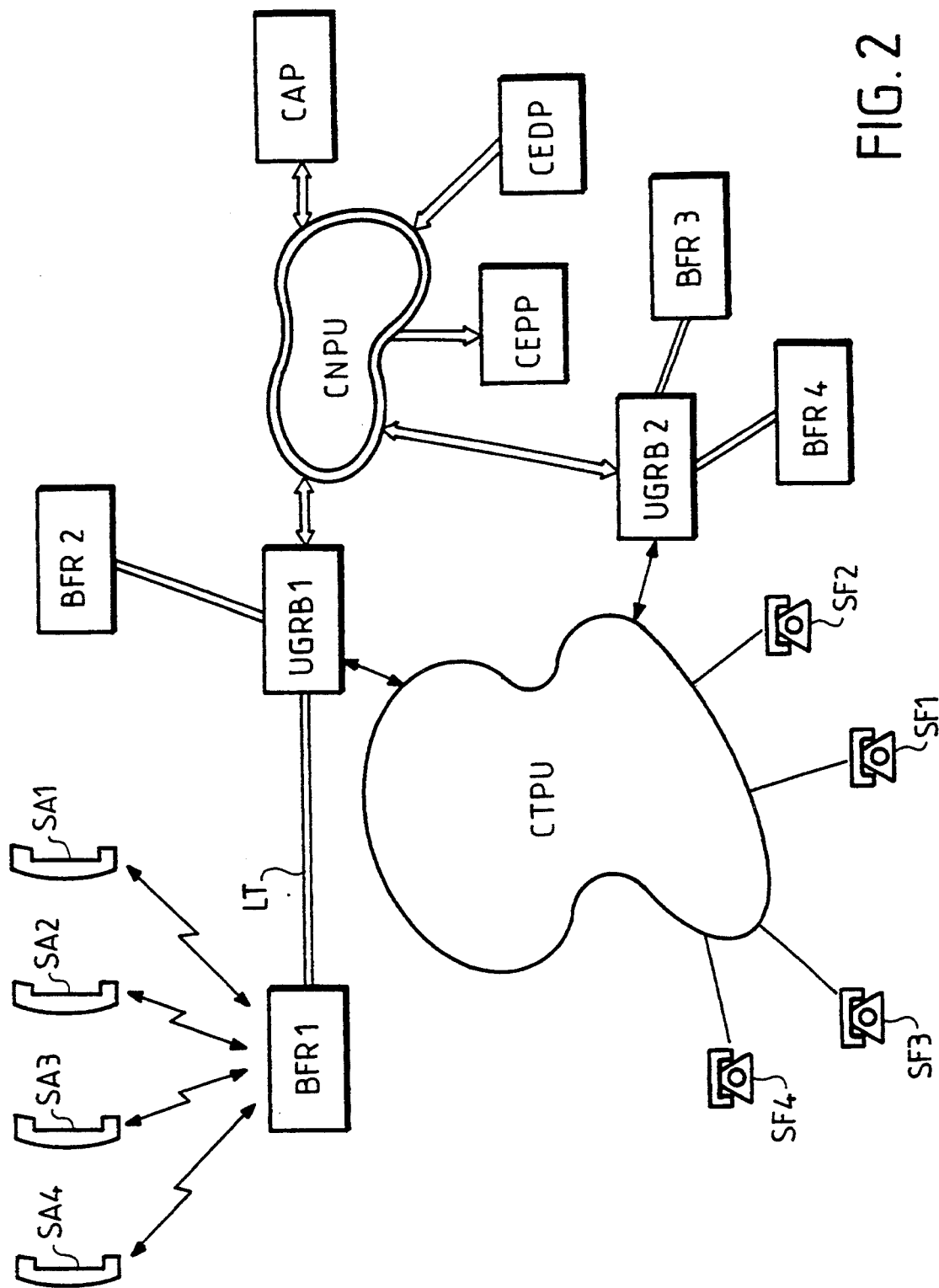
FIG. 2 is a schematic diagram of a communications network according to the invention.

FIG. 2 illustrates this novel network architecture.

The fixed management means are here preferably put together within a specific module (or a terminal management and connecting unit) UGRB1 which is able to manage and monitor the telephone communications with the independent stations SA by the intermediary of one or more fixed terminals BFR. Moreover, the fixed terminals here are divested of direct connecting means to the switched telephone network CTPU, the corresponding management and connecting unit providing such a connection.

Moreover, this unit UGRB is connected to the digital channels CNPU of the network so as to be in contact with the centers CAP, CEPP and CEDP.

It is worth noting that a fixed terminal BFR, although being able to support radio telephony links with several independent stations, is linked to its corresponding unit UGRB only via a pair of telephone wires simultaneously allowing the digital transmission of voice and signaling information for all of these telephone communications.

Needless to say, as illustrated in this FIG. 2, several units UGRB (here UGRB1 and UGRB2) can be provided, able to manage one or more fixed terminals (here BFR1–BFR4).

Figure 3:
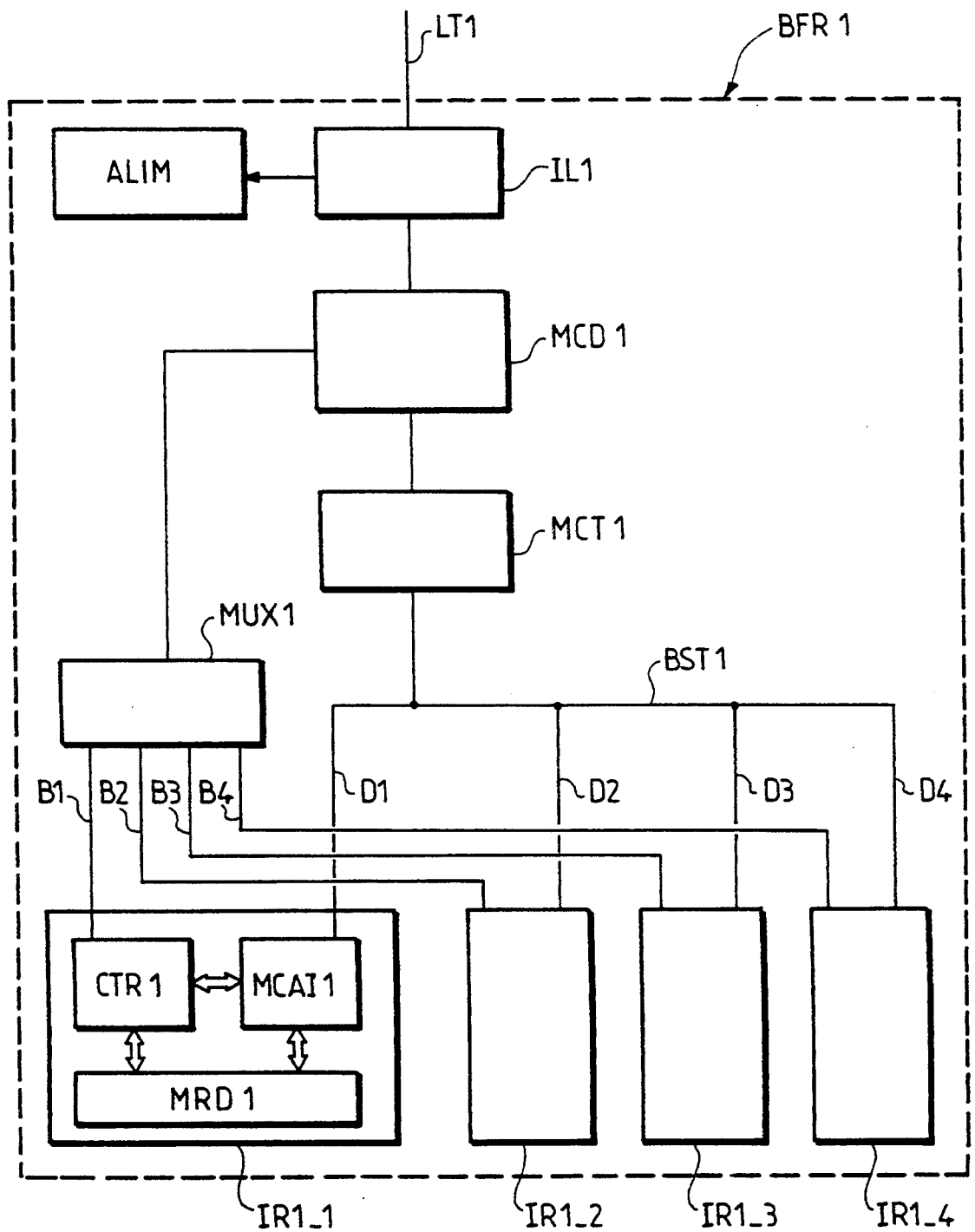
FIG. 3 is a more detailed diagram of the internal structure of a fixed terminal of the network of FIG. 2.
Figure 4:
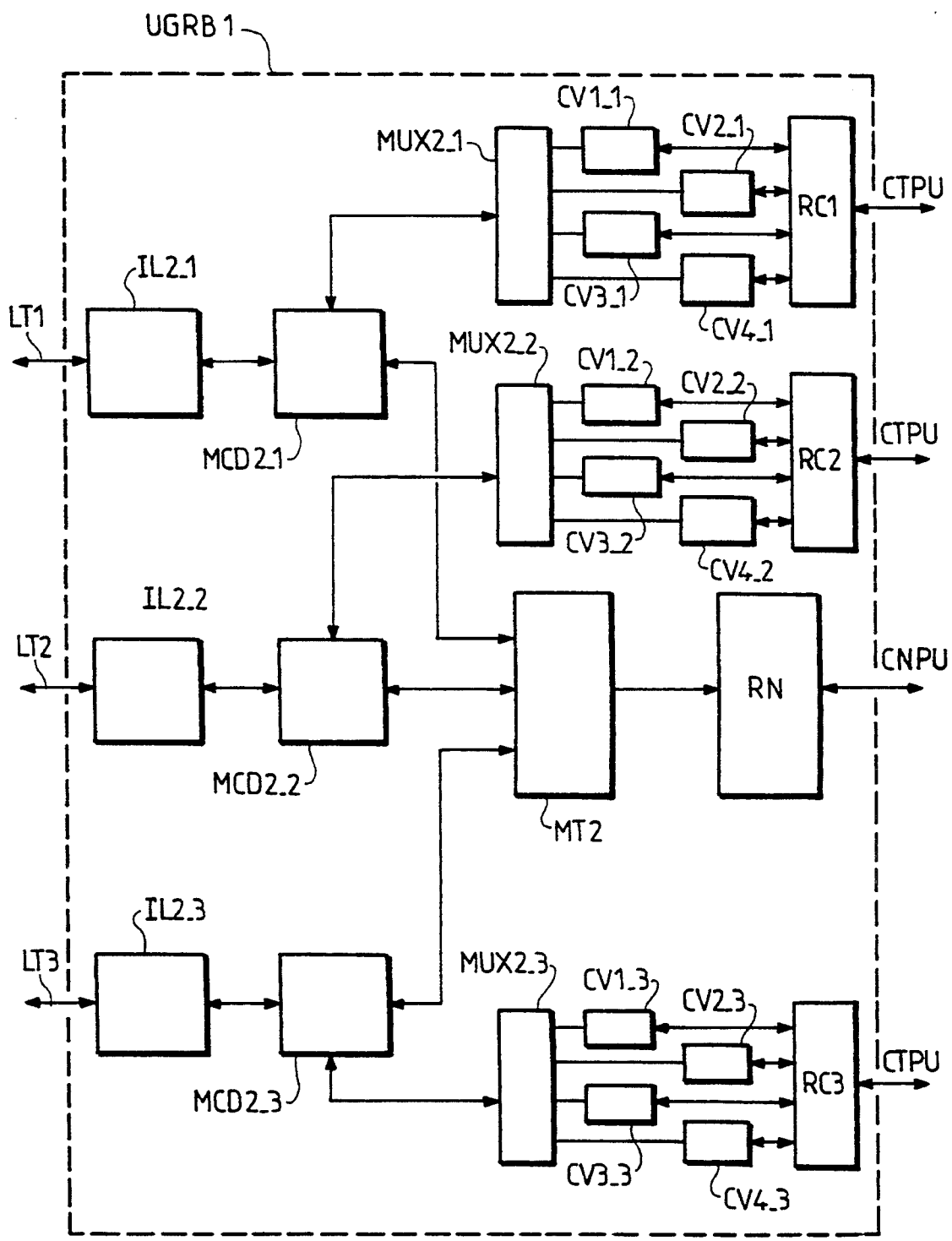
FIG. 4 is a more detailed diagram of an internal structure of a part of a management unit of the network of FIG. 2, FIGS. 5 to 9 illustrate the radiofrequency communications protocol between an independent station and a terminal, and, FIGS. 10 and 11 illustrate the communications protocol between a terminal and a management unit of the network of FIG. 2.

Here, it is the detailed architecture of a fixed terminal BFR1 (FIG. 3) and its corresponding unit UGRB1 (FIG. 4) which are of interest.

The terminal BFR1 is linked to the transmission line LT1 via a line interface IL1 comprising passive circuits such as transformers, resistors and capacitors, intended to match the link and to protect the downstream circuits.

The transmission line LT1 is also used to transmit the electrical energy intended for the power supply unit ALIM linked to the interface IL1, and intended for electrically supplying all the constituent means of the terminal BFR1. This unit ALIM thus comprises especially voltage converters as well as a buffer battery.

The first frame coding/decoding means MCD1 here are embodied by a specific component such as that marketed by the SIEMENS company under reference PEB2091.

The first multiplexing/demultiplexing means are here composed of a multiplexer/demultiplexer MUX1, and of a microcontroller MCT1 such as that marketed by the MOTOROLA company under reference 68BC11.

These first multiplexing/demultiplexing means are connected to the radiofrequency transmission/reception interface here composed of four units IR1-1, ..., IR1-4.

Each unit (for example that bearing the reference IR1-1) comprises a controller for the elementary framing transported between the independent stations and the terminal, and a local microcontroller MCA11.

These two components are linked to a radio module MRD1 for radiofrequency interaction with the independent station.

Here, units IR1-j identical to those present within already-existing terminals may be used.

At the other end of the transmission line LT1, in the unit UGRB1, a second line interface IL2-1 is provided, whose structure is similar to the first line interface.

This second line interface is connected to the second frame coding/decoding means MCD2-1, embodied by a component similar to that used for the first coding/decoding means.

The architecture of this management unit UGRB1 furthermore has, on the one hand, second multiplexing/demultiplexing means MUX2-1, embodied in a manner similar to the first multiplexer MX1 and, on the other hand, a microprocessor of the type 68302 from the MOTOROLA company embodying the second processing means of this connecting and management unit.

Means of direct connection to the telephony channels CTPU of the network are moreover provided. The latter comprise, on the one hand, a digitizing interface for the analog telephony signals transiting on the telephony channels. This interface is embodied, for example, by cards of the type marketed by the French company AETA under reference ES090.

Moreover, between the multiplexing/demultiplexing means MUX2-1 and the interface RC1, a plurality (here four) of rate conversion means CV1-1, ..., CV4-1 are provided, suitable for carrying out rate conversion compatible with the rate of signals used in the management unit URGB1 and that used over the telephony channels of the network.

These rate conversion means are embodied with the use of four boxes which carry out rate transformation from 32 kilobits per second to 64 kilobits per second and are, for example, those produced by the MOTOROLA company under reference MC 145532.

The fixed management means comprise means for digital connection RN to the digital channels of the network. The latter may, for example, be embodied based on cards such as those marketed by the MOTOROLA company under reference MVME 333. They thus make it possible to produce a digital interface conforming to the international standard CCITT X25.

Needless to say, the processing means MT2 are linked to the various connecting means RC1 and RN by the intermediary of two conventional buses which are not represented here in the interests of simplification.

Such an architecture of means makes it possible to carry on a dialog with a fixed terminal. However, the management unit UGRB1 may comprise a plurality of second line interfaces (here three, in principle thirty) IL2-2, IL2-3, connected respectively to a plurality of fixed terminals via a plurality of transmission lines LT2, LT3, a plurality of second coding/decoding means MCD2-2, MCD2-3, a plurality of second multiplexing-/demultiplexing means MUX2-2, MUX2-3 and a plurality of means of connection to the telephony channels of the network, all this plurality of means being connected to the second processing means MT2 for managing and monitoring the plurality of fixed terminals. In certain cases, the means MT2 may be physically embodied by a plurality of identical components.

The operation of the telephony device according to the invention will now be described in detail.

The radiofrequency communications exchanges between the independent stations and the fixed terminals, governed by the standard of British origin known as CAI are done by frequency modulation on the basis of one frequency band per radio communication.

The CAI standard is also known under its European reference 1-ETS 300131.

Conforming to the standard, the data exchanges during telephony communications are carried out in time duplex mode with an instantaneous rate of 72 kilobits per second. Each fixed terminal can support a plurality of radiofrequency paths comprising, in certain cases, up to three elementary channels, namely:

- an elementary signaling channel (D channel) suitable for providing the signaling information transmission,
- an elementary voice channel (B channel) suitable for providing the voice transmission during a telephone communication,
- an elementary synchronization channel (channel SYN) for synchronization of the bits and synchronization of the digital words.

So as to cope with all the particular situations or functions, the proportions of frequency bands allocated to these various channels can vary. Certain channels can even be absent in certain circumstances. These different allocations are denoted in this standard as "multiplexes". Three multiplexes are used and will be described in more detail below.

For fuller information relating to this 1-ETS 300131 standard, the person skilled in the art may refer to a document available from the "European Telecommunications Standard Institute" (ETSI). This document is, for the sake of completeness, incorporated in the description of the present Application.

The multiplex 3 (MUX3 for short) transports the channel SYN and the D channel. It is used to establish or to reestablish a link in the independent station to terminal direction. There is no B channel in this multiplex.

Figure 5:
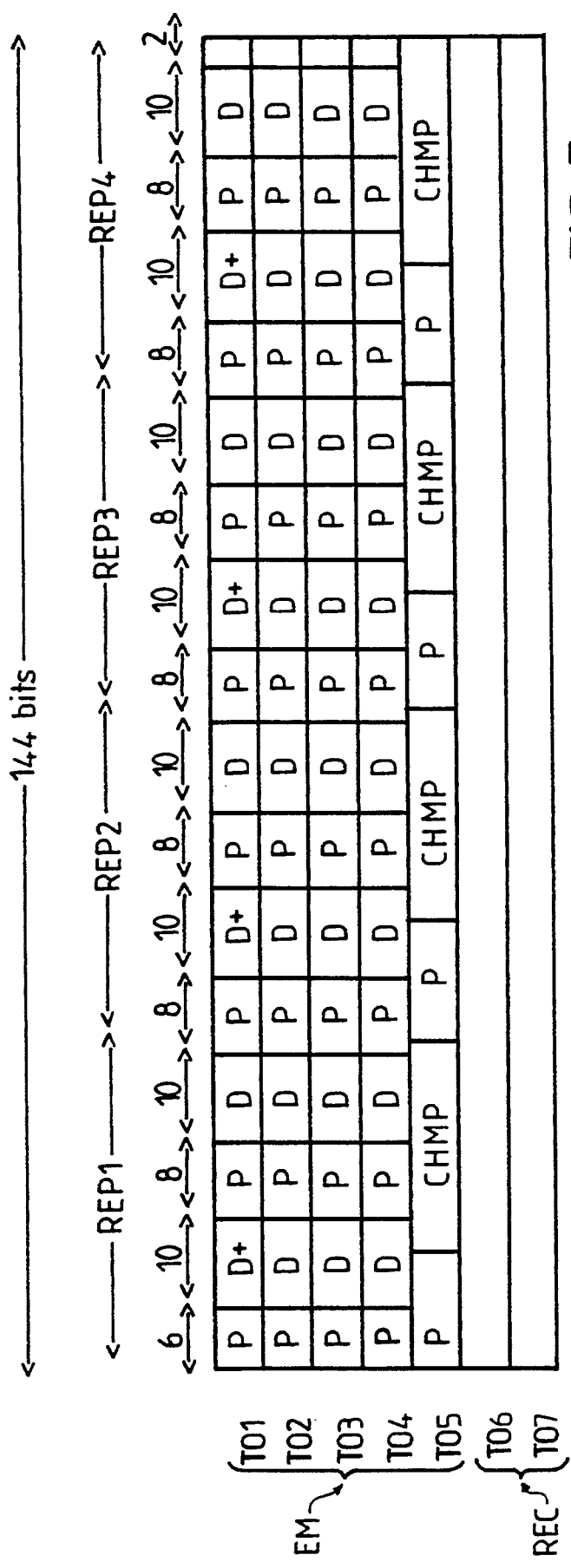

This multiplex 3 comprises two phases, repeated several times. A first phase consists in transmission from the independent station for ten milliseconds while the second phase consists in reception for four milliseconds (FIG. 5).

The transmission phase comprises five elementary frames T01–T05 of 144 bits each transporting the D channel and the channel SYN. These two channels are submultiplexed into four repetitions REP1, REP4 which respectively contain, during the first four frames, an alternating sequence of the preamble P (channel SYN) and of a ten-bit word (D channel). Some of these ten-bit words (D1) contain the start of a synchronization word.

During the fifth elementary frame T05, the channel SYN contains a 12-bit preamble P followed by the D channel containing 24 bits of a channel marker CHMP.

Figure 6:
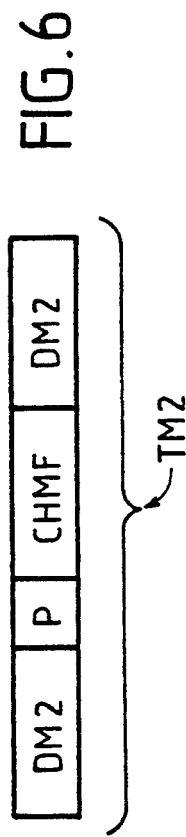

The responses from the fixed terminal are detected during the two frames T06 and T07 of the reception phase and are expressed according to the multiplex MUX2 whose structure is now described briefly by reference to FIG. 6.

This multiplex MUX2 serves to transport both the D channel and the channel SYN in order to establish or reestablish a link. There is also no B channel in the multiplex 2. According to this multiplex, the D channel has a rate of 16 kilobits per second while the channel SYN has an overall rate of 17 kilobits per second.

An elementary frame TM2 of this multiplex comprises, as far as the channel SYN is concerned, a 10-bit preamble P followed by a word containing a channel marker CBMF which turns out to be, in the case of a response in the terminal to a call from the independent station, the bit-by-bit conjugate of the channel marker CBMP. This effectively makes it possible to associate a secondary station with a fixed terminal on a one-to-one basis.

The channel SYN is framed by two 16-bit words DM2 of the D channel.

The multiplex 1, MUX1, is used in bidirectional mode over a link established in order to transmit the B and D channels. There is no channel SYN in this multiplex, which entails reinitialization of the link in the case of loss of synchronization.

Figure 7:
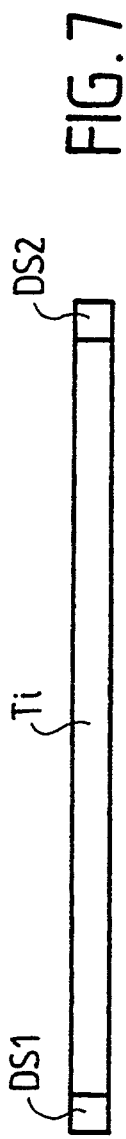
Figure 8:
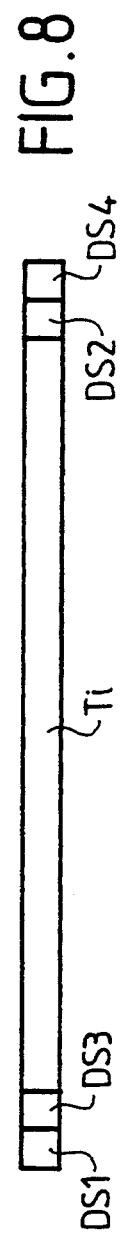

The multiplex MUX1 comprises two different types, MUX1.2 and MUX1.4 corresponding respectively to two message sizes of 66 bits or 68 bits, illustrated in FIGS. 7 and 8. The corresponding rates are 1 or 2 kilobits per second for the D channel and 32 kilobits per second for the B channel.

In FIG. 7, the elementary frame T1 (B channel) comprises 64 bits and is framed by two bits DS1 and DS2 from the D channel, thus characterizing a message of the MUX1.2 type.

In accordance with the MUX1.4 type, the elementary frame T1 of the chanel B still comprises 64 bits but this time it is framed by two pairs of bits DS1, DS3 and DS2, DS4 of the D channel (FIG. 8).

The structured radiofrequency path conforming to the MUX1 multiplexing comprises an alternating sequence of transmission frames, dedicated to the transmission of data from the terminal to the independent stations, and of frames known as reception frames in the fixed terminal, dedicated to the transmission of data coming from the independent stations.

Figure 9:
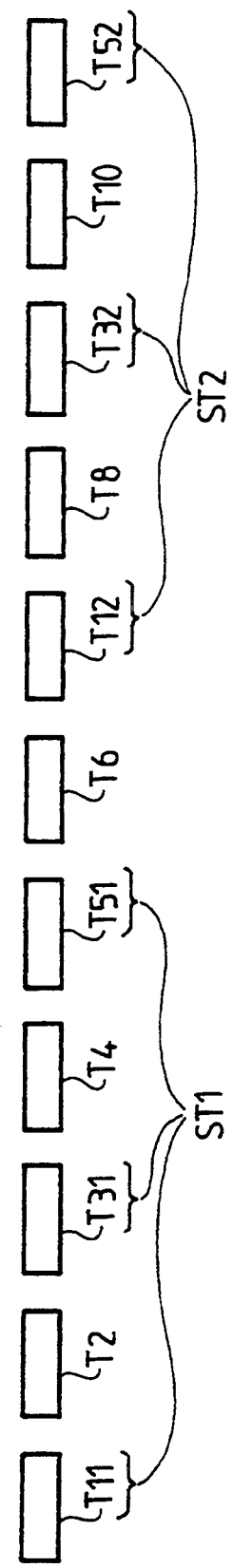

FIG. 9 illustrates this particular configuration in which, for the sake of simplification, only the elementary frames of the B channel have been represented. Hence, the frames T11, T31, T51, T12, T32 and T52 are reception frames while frames T2, T4, T6, T8 and T10 are transmission frames.

The radio module MRD1 as well as the components MCA11 and CTR1 are suitable for providing such a radio-frequency interaction with the independent stations in accordance with the CAI standard.

Figure 10:
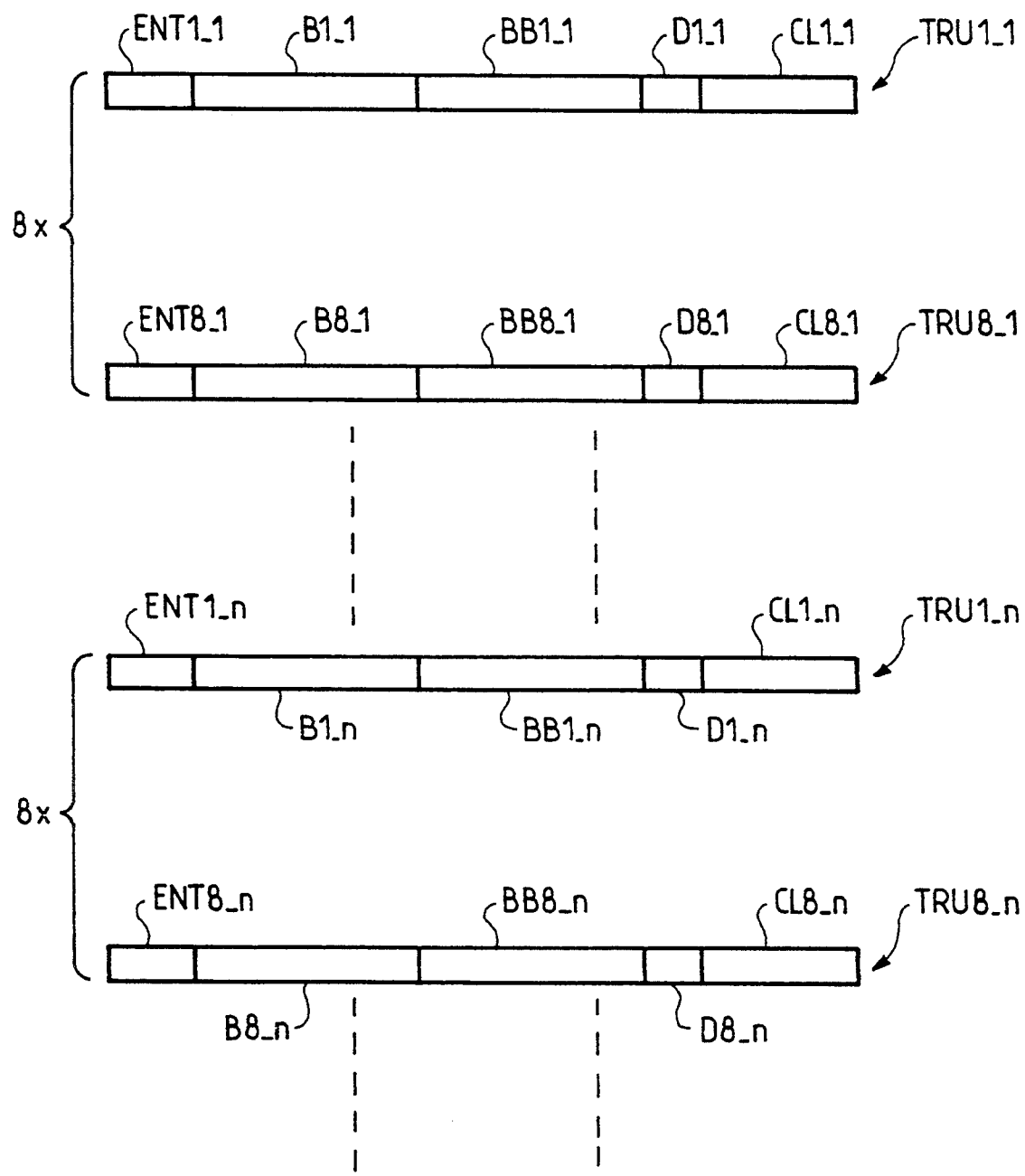
Figure 11:
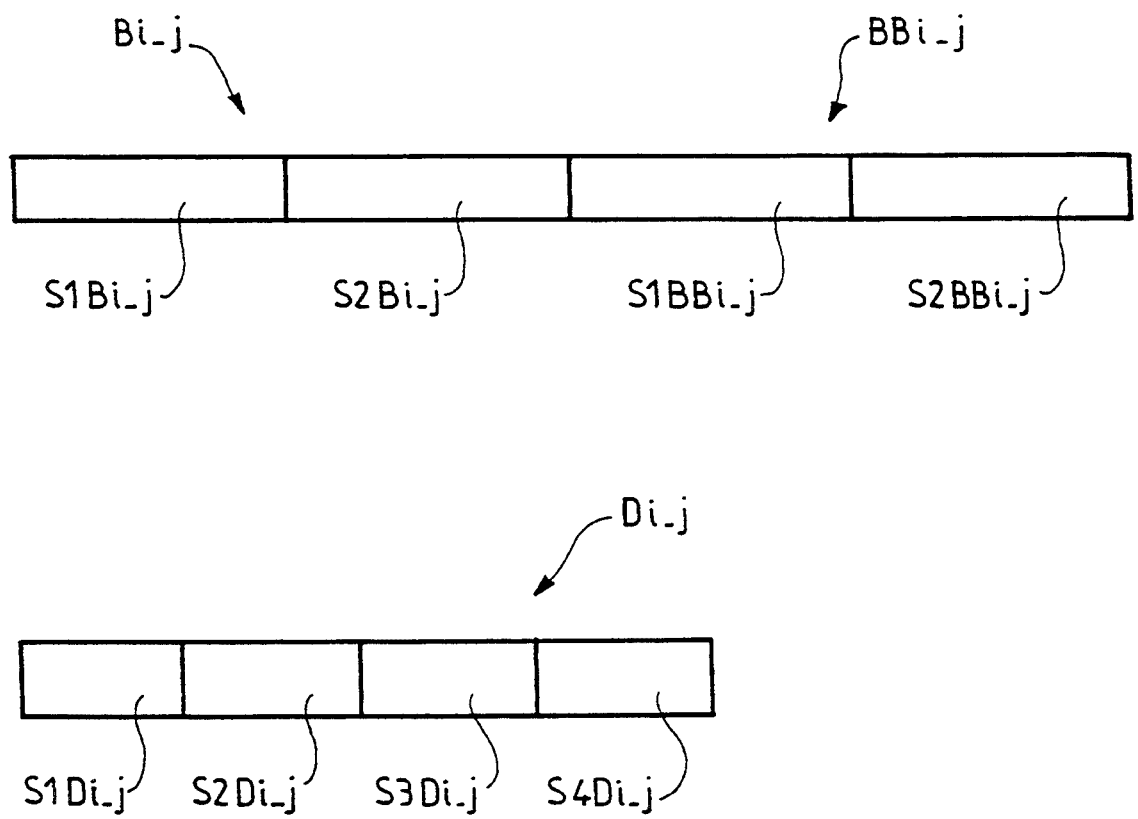

The transmission line LT1 is capable of transporting a voice channel, a signaling line channel and a monitoring line channel according to a predetermined, bidirectional, time line framing illustrated in FIGS. 10 and 11.

This line framing conforms to the specification for the U interface of the RNIS type 2B1Q transmission mode. For more information relating to the 2B1Q standard, a person skilled in the art may refer to recommendations G960 and G961 of the CCITT blue book whose contents are, for the sake of completeness, incorporated in the present description.

In the management unit UGRB to terminal direction and in the reverse direction, two multi-frames respectively flow. Each multi-frame is composed of a repetition of eight basic frames TRU1-n, ..., TRU8-n each with a duration of 1.5 milliseconds.

Each basic frame, for example frame TRU1-n, comprises a header ENT1-n composed of bits 1 to 18, followed by the voice line channel subdivided into two identical sub-channels B1-n and BB1-n.

Next comes the signaling line D channel1-n which, with the two voice sub-channels, occupies bits 19 to 234.

Bits 235 to 240 form the monitoring channel CL1-n. This monitoring line channel contains the monitoring information for the telephony link managed by first and second management means incorporated in software within the first and second coding/decoding means.

This monitoring information also makes it possible to carry out maintenance of the transmission line.

Each voice line sub-channel transports an information rate of 64 kilobits per second while the signaling line channel transports a rate of 16 kilobits per second.

The simultaneous transport of the multi-frames on the transmission line in one direction and in the other necessitates first and second echo cancellation circuits on either end of the transmission line the circuits being incorporated within the SIEMENS PEB2091 component.

In the absence of telephony links between the independent stations and the terminal, the second processing means MT2 of the unit UGRB1 are suitable for designating at least one radiofrequency path from the terminal in order to provide radiofrequency standby while waiting for the telephone call coming from an independent station, the first and second coding/decoding means being then suitable for keeping the transmission line in standby state.

The means of the unit IR1-1 of the radio interface of the terminal are then suitable for analyzing the content of the various elementary channels received at that terminal and for delivering, in the presence of a telephone call request coming from an independent station, according to the multiplex MUX3, an activity indication to the first coding/decoding means MCD1.

The first coding/decoding means are then suitable for activating the transmission line on reception of this activity indication.

In a general way, the allocation of the radio-frequency parts of the terminal is managed and monitored by the management unit UGRB1. To this end, the second processing means MT2 are suitable for delivering allocation indications of the radiofrequency paths within the signaling line channel. Such allocation indications make it possible to allocate the radiofrequency paths for standby as well as for the telephony communications and possibly to change radiofrequency path in the course of a telephony communication.

The output of the units IR1-1, ..., IR1-4, the four elementary voice channels B1-B4 and the four elementary signaling channels D1-D4 are separated and sent respectively to the first multiplexer/demultiplexer MUX1 as well as to the microcontroller MCT1.

The four voice channels B1-B4 are multiplexed in order to provide a multiplexed voice channel supplying the first coding/decoding means MCD1.

This multiplexed channel is transported by a specific bus (I.O.M.2: "ISDN Oriented Modular 2") with 4 wires connected, on the one hand, between the output of the first multiplexer/demultiplexer MUX1 and, on the other hand, the pins 31 (DCLK), 30 (FSC), 26 (DIN) and 27 (DOUT) of the SIEMENS component PEB2091. For more information relating to the specifications of this bus the person skilled in the art may refer to the user manuals for the SIEMENS component of the RNIS interface U family, and especially to that relating to the SIEMENS component PEB2091. The contents of these user manuals are, for the sake of completeness, incorporated in the present description.

Similarly, the four signaling channels D1-D4 are multiplexed in the microcontroller MCT1 and also undergo interface matching. In fact, the four elementary signaling channels have asynchronous interfaces which are incompatible with the synchronous operation of the component MCD1.

The coding/decoding means MCD1 thus receive, at their input, on the one hand the multiplexed voice channel, on the other hand the multiplexed signaling channel. The multiplexed voice channel transports an information rate of four times 32 kilobits per second while, as has been mentioned above, the two voice sub-channels Bi-J and BBi-J each transport a rate of 64 kilobits per second. Consequently, the two voice line sub-channels Bi-j and BBi-j are suitable for together transporting the four times 32 kilobits per second (S1Bi-j, S2Bi-j, S1BBi-j, S2BBi-j) of the multiplexed voice channel.

In a similar way, the signaling line D channel Di-j is suitable for transporting the four times two kilobits per second of information from the multiplexed signaling channel (S1Di-j, S2Di-J, S3Di-J and S4Di-j).

At the level of the management unit UGRB1, the second coding/decoding means MCD2-1 are suitable for separating the speech and the signaling in order to respectively restore the multiplexed voice channel and the multiplexed signaling channel.

The first of these channels is demultiplexed in the demultiplexer MUX2-1 in order to restore the four elementary voice channels which are next converted into a rate of 64 kilobits per second in the converters CV1-1, ... CV4-1 so as to be made compatible with the rate of the switched telephone network CTPU>

The second processing means MT2 carry out demultiplexing of the restored multiplex signaling channel and deliver to the digital interface RN the elementary signaling channels so that at least some of the signaling information contained within the latter can possibly flow onto the digital channels CNT of the network.

The operations described above are, needless to say, carried out in the reverse direction in order to transport the information in the management unit UGRB1 to terminal direction.

The advantages procured by the invention are as follows, in addition to those already announced:

a single cabled circuit composed of two wires makes it possible to connect the terminal to the management unit in order to simultaneously manage four telephony channels and four signaling channels.

This transmission line LT is thus also used for the total or partial power supply of the terminal as well as for synchronization of the latter and synchronization of all of the terminals linked to the management unit UGRB1, by the intermediary of the signaling line channels.

Management of the whole of the radiofrequency path channels is entirely carried out within the UGRB1 unit, which allows more efficacious sharing of the radio resources.

Hence, it is easier to distribute the communications to the radiofrequency paths having the best transmission performance characteristics, either at the establishment phase or in the course of the communications. To this end, it has proved to be easier to offer continuity of service during a telephone communication by switching the latter from one terminal to another when the user moves. It is appropriate to note here that the device according to the invention is certainly not incompatible with the contents of French Patent Publication No. 2675325 published on Oct. 16, 1992 in the name of the DASSAULT ELECTRONIQUE company for a device and a method for telephony interconnection intended to offer continuity of service to stations in a communications network. The contents of this prior Application are, for the sake of completeness, incorporated in the contents of the present description.

Research into independent handsets is improved by the device according to the invention as far as incoming calls are concerned. In this context, the person skilled in the art may refer to European Patent Publication No. 0 456 546 A1 published in the name of DASSAULT ELECTRONIQUE on Nov. 13, 1991 for a device and a method for telephony interconnection. The contents of this European Patent Application are also, for the sake of completeness, incorporated in the contents of the present Application.

The invention further makes it possible to dynamically assign unused radio paths for surveillance operations, to distribute the radio resources in the event of a breakdown of a transmission/reception module, or to use common resources (for example word synthesis) for all of the terminals, thus making it possible to improve the quality of service.

The simplicity of the radiofrequency terminals brings about a reduced space requirement, low power consumption and better reliability.

All these characteristics make it possible to facilitate the installation of a terminal in the public domain (thus offering discretion due to the small volume of the latter, and straightforward power supply by the management unit). Maintenance of such a terminal is thereby facilitated.

Finally, as the invention offers total digital transmission (at the level of the radiofrequency paths and at the level of the terminal-management unit link, as well as at the level of the telephony network), it makes it possible to easily provide numerous data transmission services.

The invention is not limited to the embodiment described above, but embraces all the variants contained within the scope of the claims which follow.

Needless to say, some of the means described above may be omitted in variants where they serve no purpose.

We claim:

1. A telephony device, intended to serve in a telephony communications network between fixed stations connected to telephony channels of the network and independent stations capable of telephony communication with said fixed stations, said telephony device comprising:

(A) at least one fixed terminal, said one fixed terminal comprising:
  (i) a radiofrequency transmission/reception interface operable over a plurality of radiofrequency channels, each being capable of transporting at least one of elementary voice channels (B) and at least one of elementary signaling channels (D) according to a predetermined elementary time framing, in order to permit voice and signaling information exchange with said independent stations,
  (ii) a first line interface with a transmission line capable of transporting at least one voice line channel and a signaling line channel according to a predetermined, bidirectional line time framing, and
  (iii) terminal processing means comprising:
    (a) first multiplexing/demultiplexing means for bidirectionally performing multiplexing-/demultiplexing between said elementary voice channels and said elementary signaling channels and, also, a multiplexed voice channel and a multiplexed signaling channel,
    (b) first frame coding/decoding means connected between said first multiplexing/demultiplexing means and said first line interface, for carrying out a bidirectional frame conversion and ensuring correspondence, between the signaling information contained in said multiplexed signaling channel and in said signaling line channel, and also between the voice information contained in said multiplexed voice channel and in said voice line channel, in order to permit the exchange of voice and signaling information between said transmission line and radiofrequency paths allocated to said independent stations in telephony communication with said fixed stations, and (B) fixed management means comprising:
  (i) a second line interface with said transmission line,
  (ii) direct connection means to said telephony channels of the network for the flow of voice information between said fixed stations and said fixed management means,
  (iii) second frame coding/decoding means, connected to said second line interface for carrying out a bidirectional frame conversion in order to restore and receive the multiplexed voice and signaling channels, (iv) second multiplexing/demultiplexing means, connected between said second frame coding/decoding means and said direct connection means, for performing bidirectional multiplexing/demultiplexing between said multiplexed voice channel and said elementary voice channels, in order to permit the exchange of voice information between said direct connection means and said second frame coding/decoding means, and (v) processing means for carrying on a dialogue with said terminal via said multiplexed signaling channel and said signaling line channel in order to manage the allocation of said radiofrequency paths and to monitor said telephony communications.

2. A device as recited in claim 1, wherein said elementary time framing comprises elementary transmission frames and elementary reception frames which are mutually offset in time, while said line time framing comprises transmission line frames and reception line frames which are transported simultaneously, and wherein said first and second coding/decoding means respectively comprise first and second echo canceling circuits.

3. A device as recited in claim 2, wherein said transmission line is operable to transport a monitoring line channel containing monitoring information for a telephony link, and wherein said first and second coding/decoding means respectively comprise first and second means for managing said monitoring information.

4. A device as recited in claim 1, wherein the processing means are suitable for delivering radiofrequency path allocation indications within said signaling line channel.

5. A device as recited in claim 1, wherein said processing means is operable to designate at least one of said radiofrequency paths for providing radiofrequency standby while waiting for a telephone call originating from one of said independent stations, while said first and second coding/decoding means are operable for maintaining said transmission line in standby, wherein said radiofrequency transmission/reception interface of said terminal comprises local processing means for analyzing the contents of elementary channels received at said terminal, and for delivering, in the presence of a telephone call request originating from one of said independent stations, an activity indication to said first coding/decoding means, and wherein said first coding/decoding means is operable for activating said transmission line on reception of said activity indication.

6. A device as recited in claim 1, wherein said radiofrequency interface of said terminal comprises local processing means for analyzing the contents of said elementary channels received at said terminal, and for separately delivering different elementary voice channels, and corresponding different elementary signaling channels, wherein said first multiplexing/demultiplexing means comprises a first multiplexer/demultiplexer, connected between said radiofrequency transmission/reception interface and said first coding/decoding means, and being operable for operating on said elementary voice channels and on said multiplexed voice channel, and a microcontroller, connected between said radiofrequency transmission/reception interface and said first coding/decoding means, and being operable for operating on said elementary signaling channels and on said multiplexed signaling channel, as well as for carrying out matching of a bidirectional synchronous/asynchronous interface between said radiofrequency transmission/reception interface and said first coding/decoding means.

7. A device as recited in claim 1, wherein said voice line channel is subdivided into two line sub-channels for transporting voice information according to a first, predetermined line rate, while each of said elementary voice channels is operable for transporting the voice information according to a second, predetermined elementary rate equal to half of said first predetermined line rate, said first and second multiplexing/demultiplexing means being operable for multiplexing/demultiplexing four elementary voice channels.

8. A device as recited in claim 7, wherein said first and second multiplexing/demultiplexing means are operable for multiplexing/demultiplexing a number of said elementary signaling channels being equal to the number of said elementary voice channels.

9. A device as recited in claim 1, wherein said connecting means for said fixed management means comprises rate conversion means for providing a rate conversion compatible with a voice rate used on said telephony channels of the network and that of said elementary voice channels.

10. A device as recited in claim 1, wherein said telephony communications network comprises a digital communications medium, wherein said fixed management means further comprises means for digital connection to said digital communications medium in order to provide flow of at least some of the signaling information between said fixed management means and said digital communications medium.

11. A device as recited in claim 1, wherein said terminal comprises power supply means for ones of said means incorporated into said terminal, said power supply means being connected to said first line interface in order to receive said electrical energy from said transmission line.

12. A device as recited in claim 1, wherein said fixed management means comprises a plurality of second line interfaces connected respectively to a plurality of fixed terminals, a plurality of second coding/decoding means, a plurality of second multiplexing/demultiplexing means and a plurality of means for connection to said telephony channels of the network, each of said means of said fixed management means being connected to said processing means in order to manage and monitor said plurality of fixed terminals.

13. A device as recited in claim 12, wherein said processing means provides synchronization of all said terminals by an intermediary of said signaling line channel of each transmission line.

14. A device as recited in claim 1, wherein said fixed management means is incorporated within a single module.

* * * * *